(12) United States Patent
Sahara et al.

(10) Patent No.: US 7,032,041 B2
(45) Date of Patent: Apr. 18, 2006

(54) INFORMATION PROCESSING PERFORMING PREFETCH WITH LOAD BALANCING

(75) Inventors: Hirofumi Sahara, Yokohama (JP);
Masuji Suzuki, Yokohama (JP);
Hiroshi Yokouchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/802,859

(22) Filed: Mar. 18, 2004

(65) Prior Publication Data
US 2005/0108450 A1 May 19, 2005

(30) Foreign Application Priority Data
Nov. 18, 2003 (JP) ............................. 2003-387863

(51) Int. Cl.
*G06F 3/00* (2006.01)
(52) U.S. Cl. ...................... 710/38; 710/36; 711/113; 711/114; 711/118
(58) Field of Classification Search .................. 710/38, 710/36; 711/113, 114, 118
See application file for complete search history.

(56) References Cited

U.S. PATENT DOCUMENTS

| | | | |
|---|---|---|---|
| 5,146,578 A | | 9/1992 | Zangenehpour |
| 5,680,574 A | * | 10/1997 | Yamamoto et al. ......... 712/207 |
| 5,740,465 A | | 4/1998 | Matsunami et al. |
| 5,940,838 A | | 8/1999 | Schmuck et al. |
| 6,021,508 A | | 2/2000 | Schmuck et al. |
| 6,145,028 A | | 11/2000 | Shank et al. |
| 6,473,782 B1 | * | 10/2002 | Casper et al. ............... 709/201 |
| 6,708,254 B1 | * | 3/2004 | Lee et al. .................... 711/120 |
| 6,721,814 B1 | * | 4/2004 | Litvin et al. .................... 710/6 |
| 6,915,403 B1 | * | 7/2005 | Yamamoto et al. ......... 711/202 |
| 2003/0163649 A1 | | 8/2003 | Kapur et al. |
| 2003/0177320 A1 | | 9/2003 | Sah et al. |
| 2004/0022094 A1 | | 2/2004 | Radhakrishnan et al. |

FOREIGN PATENT DOCUMENTS

JP          2003-99384          4/2003

OTHER PUBLICATIONS

"VERITAS Volume Manager 3.5—Amdiminstrator's Guide (Solaris)", Internet Article, Online, Jul. 2002, XP002319748, retrieved from the Internet: URL: http//ftp.support.veritas.com/pub/support/products/VolumeManager UNIX/248606.pdf., retrieved on Feb. 25, 2005.
"Using SANs and NAS, Help Storage Administrators" O'Reilly, Feb. 2002, pp. 54-55.

* cited by examiner

*Primary Examiner*—Dov Popovici
*Assistant Examiner*—Niketa I. Patel
(74) *Attorney, Agent, or Firm*—Mattingly, Stanger, Malur & Brundidge, P.C.

(57) ABSTRACT

In an information processing system comprising a storage equipment which includes a logical unit logically assigned to physical devices and an information processing apparatus which sends data input/output requests to the storage equipment, wherein the data input/output requests are transferred through logical paths serving as communication paths to the logical unit, the information processing apparatus comprises a path selection management section which manages configurations of a plurality of blocks into which the logical unit is divided, an I/O request allocation section which allocates data input/output requests to be transmitted to the storage equipment to the logical paths, and I/O processing units which transmit the data input/output requests through the logical paths, according to the allocation determined by the I/O request allocation section, pursuant to an established protocol, wherein the path selection management section assigns at least one logical path to one block.

13 Claims, 14 Drawing Sheets

FIG.4

| Path ID | LU | Path Status | Sequential I/O Count | Random I/O Count |
|---|---|---|---|---|
|  |  |  |  |  |
|  |  |  |  |  |

Path Management Table  2100

2101, 2102, 2103, 2104, 2105

LU Management Table

FIG.6

Block Management Table 2300

| Block ID 2301 | Block Length 2302 | LU 2303 | Start Address 2304 | Path ID 2305 | Sequential Access Count 2306 | Random Access Count 2307 |
|---|---|---|---|---|---|---|
| 1 | | | | | | |
| 2 | | | | | | |

FIG.9

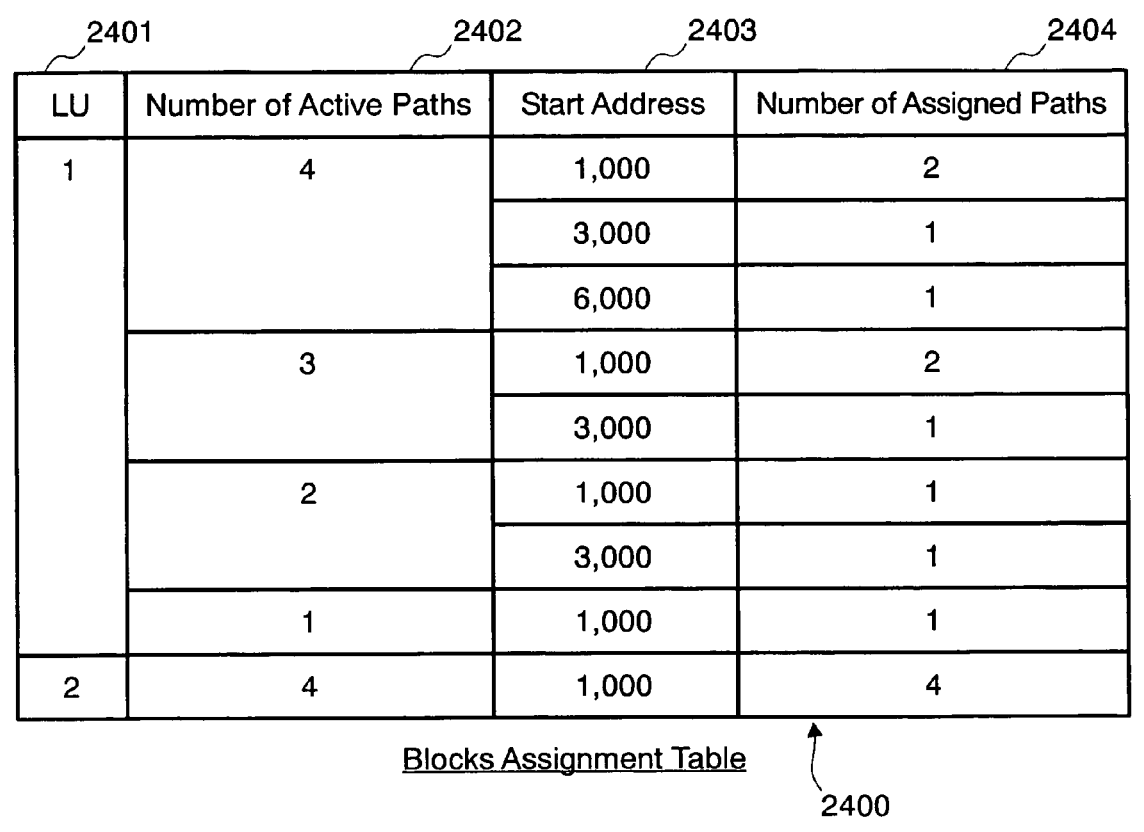

| LU | Number of Active Paths | Start Address | Number of Assigned Paths |
|---|---|---|---|
| 1 | 4 | 1,000 | 2 |
|   |   | 3,000 | 1 |
|   |   | 6,000 | 1 |
|   | 3 | 1,000 | 2 |
|   |   | 3,000 | 1 |
|   | 2 | 1,000 | 1 |
|   |   | 3,000 | 1 |
|   | 1 | 1,000 | 1 |
| 2 | 4 | 1,000 | 4 |

Blocks Assignment Table
2400

US 7,032,041 B2

INFORMATION PROCESSING PERFORMING PREFETCH WITH LOAD BALANCING

BACKGROUND OF THE INVENTION

The present invention relates to an information processing apparatus, a method for controlling the information processing apparatus, a computer program to implement the functions of the above apparatus, and an information processing system. More particularly, the invention relates to the information processing apparatus that makes effective use of a cache memory when reading data from storage equipment.

Data amount to be handled by an information processing system has lately been growing. Correspondingly, the capacity of storage equipment for use in such a system has become larger and the storage equipment is required to have higher input/output performance and reliability commensurate with its larger capacity. In view hereof, storage network technology which uses multiplex logical paths (input/output paths) to storage equipment and appropriately allocates data input/output requests (I/O requests) to the logical paths has been developed (for example, W. Curtis Preston, "Using SANs and NAS, Help for Storage Administrators" O'Reilly, February 2002, pp. 54–55).

In the foregoing prior art, the storage equipment executes processes in response to I/O requests in order in which it received the I/O requests from its host information processing apparatus.

However, the I/O requests that the storage equipment receives include conjunct ones and a mechanism for efficiently executing the processes in response to the I/O requests, focusing attention on the distinctiveness of the I/O requests, has not been developed. In particular, when a load balancing function is performed, I/O requests are evenly distributed across the paths and I/O requests for access to sequential locations of data, namely, sequential access, also may be allocated to different paths. The storage system side cannot distinguish I/O requests for sequential data access and, consequently, it has occurred that prefetch caching does not function effectively, which results in a decrease in access performance.

A method of allocating sequential access I/O requests to a same path to process them has been proposed. However, if a plurality of applications get access to a same logical unit, I/O requests from the applications are serialized and, therefore, sequential access I/O requests from one application are not always to be sequential in access to successive locations on the logical unit. In this case, it also occurs that prefetch caching does not function effectively, which results in a decrease in access performance.

SUMMARY OF THE INVENTION

An object of the present invention is to provide an information processing system that enables efficient execution of I/O processes through effective use of prefetch caching by allocating sequential I/O requests to a same path.

A primary aspect of the present invention may be defined as follows. In an information processing system comprising a storage equipment which includes a logical unit logically assigned to physical devices and an information processing apparatus which sends data input/output requests to the storage equipment, wherein the data input/output requests are transferred through logical paths serving as communication paths to the logical unit, a cache memory is provided to prefetch and store both data in a location to be accessed by an input/output request and data in locations following that location within the physical devices and the information processing apparatus comprises a path selection management section which manages configurations of a plurality of blocks into which the logical unit is divided, an I/O request allocation section which allocates data input/output requests to be transmitted to the storage equipment to the logical paths, and I/O processing units which transmit the data input/output requests through the logical paths, according to the allocation determined by the I/O request allocation section, pursuant to an established protocol. The path selection management section assigns at least one logical path to one block.

In the present invention, because the path selection management section which manages configurations of a plurality of blocks into which a logical unit is divided assigns at least one logical path to one block, prefetch caching can be used effectively.

BRIEF DESCRIPTION OF THE DRAWINGS

FIG. 4 shows an illustrative path management table that is used in the embodiment of the present invention;

FIG. 6 shows an illustrative block management table that is used in the embodiment of the present invention;

FIG. 9 shows an illustrative blocks assignment table that is used in the embodiment of the present invention;

DETAILED DESCRIPTION OF THE PREFERRED EMBODIMENTS

Preferred embodiments of the present invention will be described hereinafter with reference to the accompanying drawings.

Figure 1:
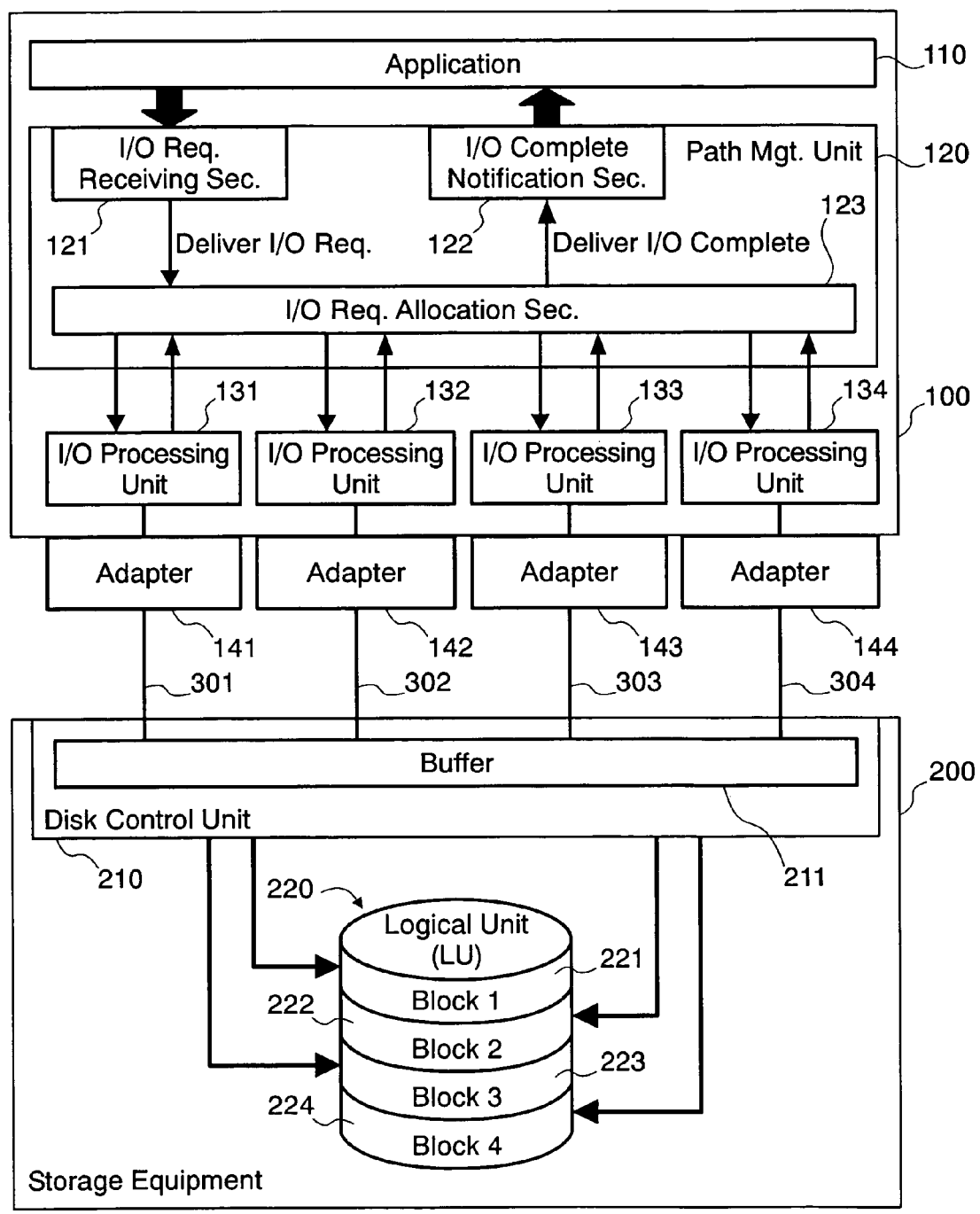
FIG. 1 is a block diagram showing an overall structure of an information processing system according to a preferred embodiment of the present invention.

FIG. 1 is a block diagram showing an overall structure of an information processing system according to a preferred embodiment of the invention.

The information processing system comprises at least one unit of information processing apparatus 100 and at least one unit of storage equipment 200. In the present embodiment, the information processing system comprised of one unit of information processing apparatus 100 and one unit of storage equipment 200 is discussed. However, the information processing system may be comprised of two or more units of information processing apparatus 100 and two or more units of storage equipment 200.

To the information processing apparatus 100, the storage equipment 200 is connected via a network (for example, Storage Area Network (SAN)). Communication between the information processing apparatus 100 and the storage equipment 200 via the SAN is generally performed, pursuant to a Fibre Channel Protocol. Specifically, from the information processing apparatus 100, a request to access data in units of blocks is transmitted to the storage equipment 200, pursuant to the Fiber Channel Protocol. The information processing apparatus 100 and the storage equipment 200 are not necessarily connected via the SAN; they may be connected via a network such as LAN or may be directly connected through a Small Computer System Interface (SCSI).

A plurality of paths (logical paths) 301 to 304 are set up to constitute the SAN connecting the information processing apparatus 100 and the storage equipment 200. The information processing apparatus 100 accesses data stored on the storage equipment 200 through the plurality of logical paths 301 to 304. The logical paths 301 to 304 are associated with physical paths that are data transfer lines, physically provided by hardware, to connect the information processing apparatus 100 and the storage equipment 200.

The information processing apparatus 100 includes a CPU (Central Processing Unit), a memory, etc. and executes various types of application programs. The information processing apparatus 100 comprises an application 110, a path management unit 120, a plurality of I/O processing units 131 to 134, and a plurality of adapters 141 to 144.

The application 110 represents diverse application programs (for, example, programs for a bank's automatic teller system, a seat reservation system of airlines, etc.) to be run on the information processing apparatus 100. The application program performs tasks, while accessing data stored on the storage equipment 200.

The adapters 141 to 144 are interfaces for communication with the storage equipment 200; for example, SCSI adapters or Host Bus Adapters (HBAs) such as Fibre Channel adapters. Through the adapters 141 to 144, the information processing apparatus 100 can send data input/output requests (I/O requests) to and receive data from the storage equipment 200.

The I/O processing units 131 to 134 are realized by drivers and software for controlling the adapters 141 to 144 (for example, SCSI drivers). The I/O processing units 131 to 134 processes I/O requests delivered from the path management unit 120 sequentially. The I/O processing units 131 to 134 convert I/O requests into packets of an established communication protocol (Fibre Channel, TCP/IP, etc.) and transmit the packets through the adapters 141 to 144 to the storage equipment 200. In the embodiment as will be set forth herein below, the storage equipment 200 is provided with a data buffer 211. However, the I/O processing units 131 to 134 or the adapters 141 to 144 may be provided with the data buffer.

Path management software runs on the path management unit 120 to manage the logical paths 301 to 304 between the information processing apparatus 100 and the storage equipment 200. The path management unit 120 multiplexes the logical paths 301 to 304 through which I/O requests are transmitted to the storage equipment 200 and expands the bandwidth of each path, thereby preventing a bottleneck in data access and enhancing data I/O processing performance. The path management unit 120 allocates I/O requests to the logical paths 301 to 304 for load balancing. Moreover, the path management unit 120 has a function to disconnect a logical path, one of the paths 301 to 304, in which a fault has occurred and allow access to data on the storage equipment 200 to continue through the remaining sound ones among the logical paths 301 to 304. This function avoids service stoppage due to a logical path fault and boosts the reliability of the system.

While the information processing apparatus 100 is assumed to be a computer (personal computer, work station, mainframe computer, etc.) in the description of the present embodiment, the information processing apparatus 100 may be a network device such as a router and a hub.

Access from the information processing apparatus 100 to data stored on the storage equipment 200 is performed by an I/O request such as, for example, a data write request or a data read request. This I/O request is issued from the application 110 that is one of a variety of applications. In the I/O request, a header, storage equipment, logical unit, address, data length, etc. are specified. The header contains the identifier of the information processing apparatus 100 that sends the I/O request. The storage equipment field contains the identifier of the storage equipment to which the I/O request is to be delivered and processed. The logical unit field contains the identifier of a logical unit from which data is to be read or to which data is to be written by the I/O request in the storage equipment. The address field contains the address (start address) at which data read or write will start. The data length field contains the size (length) of the data to read or write. If the I/O request is a data write request, the data to write is added to the request.

I/O requests issued from the application are distributed among the logical paths 301 to 304 by the path management unit 120 (for example, the requests are evenly allocated among the paths) and transmitted to the storage equipment 200. By parallel transfer of a plurality of I/O requests in this way, the processing performance of the information processing system can be enhanced.

The storage equipment 200 comprises a disk control unit 210, a logical unit (LU) 220, and other entities and performs data input/output processing, according to the I/O request received from the information processing apparatus 100.

The logical unit 220 is a logically set up unit of storage space from storage resources (physical devices) which are provided to the information processing apparatus 100. In FIG. 1, the storage equipment 200 has one logical unit; however, may have two of more logical units. The logical unit 220 is divided into a plurality of blocks 221 to 224 and the logical paths 301 to 304 are set linked to the blocks 221 to 224 in one-to-one correspondence. As the storage resources, a variety of storage media such as hard disk devices (disk array devices), flexible disk devices, and semiconductor storage devices can be used.

The disk control unit 210 receives I/O requests transmitted from the information processing apparatus 100 and controls access to data stored on the logical unit 220. The disk control unit 210 has a data buffer 211. The data buffer 211 is provided to be used commonly for the logical paths

301 to 304. Data buffers may be provided for each of the logical paths 301 to 304. The data buffer 211 functions as a cache memory into which data to write to the logical unit 220 or data read from the logical unit 220 is stored temporarily.

In the present embodiment, the storage equipment 200 is provided with a prefetch caching function. The prefetch caching function works as follows. If a location on the logical unit 220 specified in an I/O request that has just been received through a logical path by the storage equipment 200 succeeds a location on the logical unit 220 specified in an I/O request previously received through the same logical path, the prefetch caching function prefetches the data in the location (sequential locations) following the location on the logical unit 220 specified in the previous I/O request from the logical unit 220 and stores that data into the data buffer 211 in advance. This prefetch caching function enables effective use of data existing in the data buffer 211 when I/O requests that specify consecutive locations on the logical unit 220 are received through the same logical path from the information processing apparatus 100 and, consequently, time required for data input/output processing can be shortened.

When data write requests are transmitted from the information processing apparatus 100 through the logical paths 301 to 304, an action such as read, modify, or write is performed on the data buffer 211 in the storage equipment 200.

For example, if a data write request is transmitted from the information processing apparatus 100 through a logical path, one of 301 to 304, the storage equipment 200 writes the data into the data buffer 211. Upon the completion of writing the data into the data buffer 211, the storage equipment 200 transmits a data write request complete notification (I/O complete notification) back to the information processing apparatus 100 through the same logical path, one of 301 to 304, through which the data write request (I/O request) was transmitted, regardless of whether or not writing of the data to the logical unit 220 is complete. In other words, the I/O complete notification is sent to the information processing apparatus 100, not synchronously with actual data writing to the logical unit 220. After that, the disk control unit 210 writes the data that has been written into the data buffer 211 to the logical unit 220.

If a data read request is transmitted from the information processing apparatus 100 through a logical path, one of 301 to 304, the storage equipment 200 judges whether the data to read exists in the data buffer 211. If the data to read exists in the data buffer 211, the storage equipment 200 reads the data from the data buffer 211 and transfers the data that has existed in the data buffer 221 to the information processing apparatus 100 without reading the data from a disk.

Otherwise, if the data to read does not exist in the data buffer 211, the disk control unit 210 reads the data in the location specified in the data read request from the logical unit 220 and transfers that data to the information processing apparatus 100.

At this time, when the disk control unit 210 reads the data from the location specified in the received data read request on the logical unit 220, if locations (sequential locations) following the specified location exist, the disk control unit 210 reads data in the subsequent sequential locations (sequential data) from the logical unit 220 and stores the thus read data (sequential data from the specified location and subsequent locations) into the data buffer 211.

By the above-described prefetch caching function, data existing in the data buffer 211 can be used and I/O processing time can be shortened, because I/O requests for consecutive locations in a same block on the logical unit 220 from the information processing apparatus 100 and responses are transmitted and received through the same logical path.

The disk control unit 210 can be integrated into the storage equipment 200 as shown in FIG. 1 or can be provided as a separate entity. The logical unit can be divided into a plurality of partitions.

Figure 2:
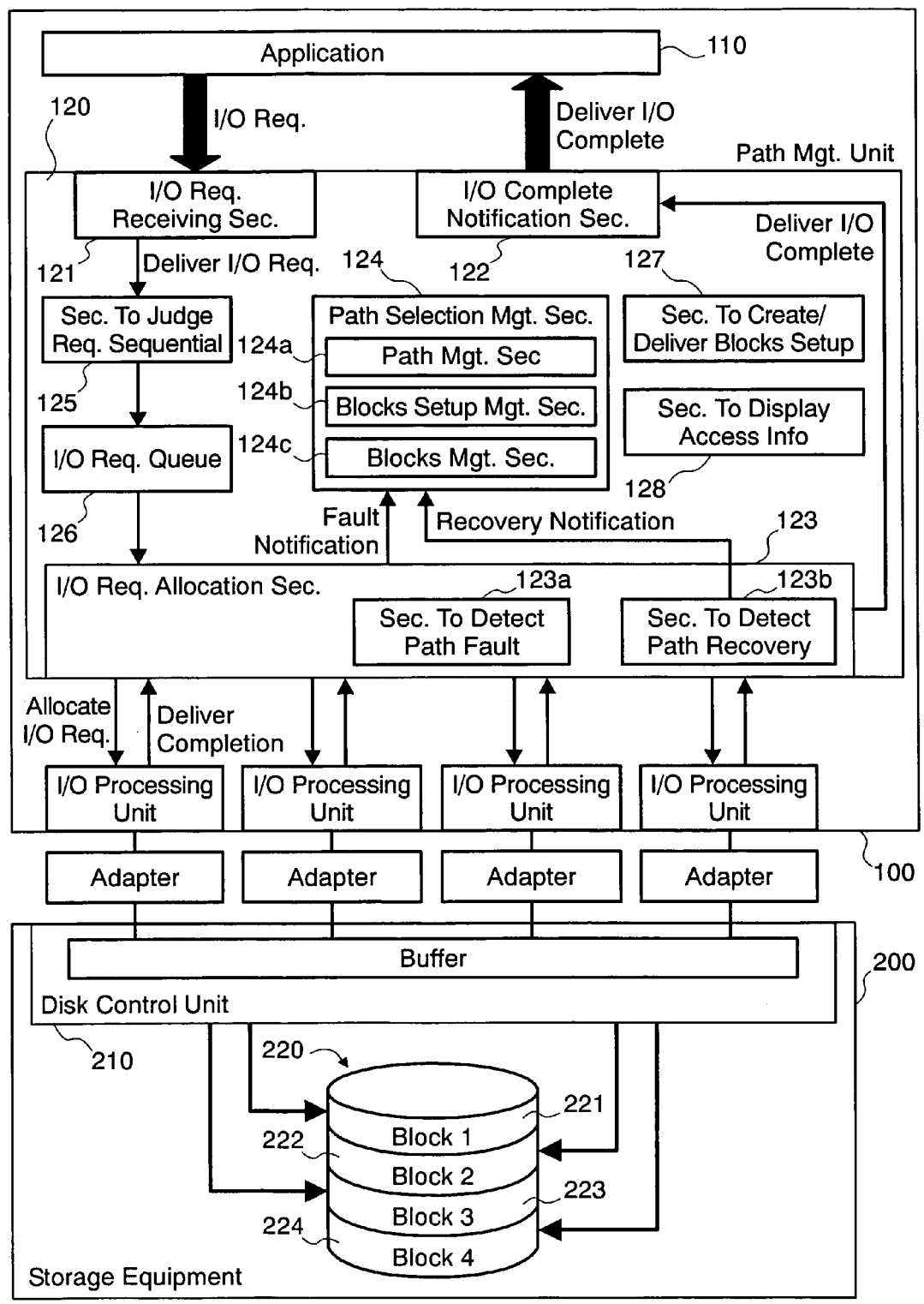
FIG. 2 is a block diagram of the information processing system of the embodiment of the present invention, including a detailed configuration of a path management unit.

FIG. 2 is a block diagram of the information processing system shown in FIG. 1, including a detailed configuration of the path management unit 120.

The path management unit 120 is comprised of an I/O request receiving section 121, an I/O complete notification section 122, an I/O request allocation section 123, a path selection management section 124, a section to judge request sequential 125, a section to create/deliver blocks setup 127, and a section to display access information 128.

The I/O request receiving section 121 receives I/O requests issued from the application 110. The I/O complete notification section 122 notifies the application 110 of the completion of processing of an I/O request that the I/O request receiving section 121 received from the application 110.

The section to judge request sequential 125 judges whether an I/O request that the I/O request receiving section 121 has just received from the application 110 is sequential I/O request. Specifically, the section to judge request sequential 125 judges whether a storage location specified in the just received I/O request (that is assumed to be the second I/O request of sequential I/O access) succeeds a storage location specified in an I/O request (that is the first one of the sequential I/O) received from the application 110 before the reception of the second I/O request. This judgment is made by comparing the just received request (second) to all I/O requests previously stored in the data buffer 211 as to whether:

(1) the storage equipment specified in the second I/O request matches the storage equipment specified in the first I/O request;

(2) the logical unit specified in the second I/O request matches the logical unit specified in the first I/O request; and (3) the address specified in the second I/O request is equal to the address plus the data length specified in the first I/O request.

If the first I/O request that meets all the foregoing judgment criteria (1) to (3) exists, the section to judge request sequential 125 judges the second I/O request to be sequential I/O request. Otherwise, if there is not the first I/O request that meets the foregoing judgment criteria (1) to (3), the section to judge request sequential 125 judges the second I/O request to be random I/O request. This judgment as to whether the just received I/O request is sequential is made by comparing the second I/O request of data read to previously buffered I/O requests of data read to find the first one of sequential read and comparing the second I/O request of data write to previously buffered I/O requests of data write to find the first one of sequential write.

After judged sequential or random by the section to judge request sequential 125, the I/O requests are queued into an I/O request queue 126 until they are allocated.

The I/O request allocation section 123 determines one of the I/O processing units 131 to 134 to which to allocate an I/O request from the I/O request queue 126 and selects one of the logical paths 301 to 304 to be used to transmit the I/O request. The I/O processing units are provided for the paths, respectively, and process the I/O requests allocated to the paths and get access to the storage equipment 200.

When an I/O request is allocated by the I/O request allocation section 123, a path assigned to a block where data to be acted upon by the I/O request exists (block including the address specified in the I/O request) is selected. The I/O request allocation section 123 allocates I/O requests to distribute them evenly among the paths by the load balancing function. For example, the I/O request allocation section 123 preferentially allocates an I/O request to an I/O processing unit, one of 131 to 134, that is now idle or an I/O processing unit, one of 131 to 134, that has completed I/O request processing.

The I/O request allocation section 123 includes a section to detect path fault 123*a* and a section to detect path recovery 123*b* which realize a path status check function to detect change in the statuses of the paths to the storage equipment 200. Specifically, when user operation has been performed to place a path in an offline state (a blocked state that the path cannot transmit an I/O request normally due to a fault occurring in the path) or upon the detection of a path fault during I/O request processing, the section to detect path fault 123*a* regards the path status as having changed and notifies a path management section 124*a* of the path fault. When the path recovers by an automatic path recovery function that each of the I/O processing units 131 to 134 has, the section to detect path recovery 123*b* detects the recovery of the path from the fault and notifies the path management section 124*a* of the path recovery. This automatic path recovery function attempts transmission of an I/O simulated signal through the path that is inactive at predetermined timing, for example, at certain intervals, and checks whether the signal has been transmitted normally, thereby checking whether the path has recovered, not by explicit user operation to return the inactive path to the active state.

The path selection management section 124 is comprised of the path management section 124*a*, a blocks setup management section 124*b*, and a block management section 124*c* The path management section 124*a* creates a path management table 2100 (FIG. 4). The blocks setup management section 124*b* creates an LU management table 2200 (FIG. 5), referring to the path management table 2100. The block management section 124*c* creates a block management table 2300 (FIG. 6), referring to the LU management table 2200.

The section to create/deliver blocks setup 127 is provided to be used in a variable blocking mode which will be described later. The section to create/deliver blocks setup 127 creates a blocks assignment table 2400, based on operator input, and retains the table.

The section to display access information 128 outputs sequential access I/O counts and random access I/O counts per block. For example, this section outputs information (such as sequential/random access counts) necessary for the user to change settings. In this case, the user must be conscious of dividing the logical unit into blocks and change settings.

Figure 3:
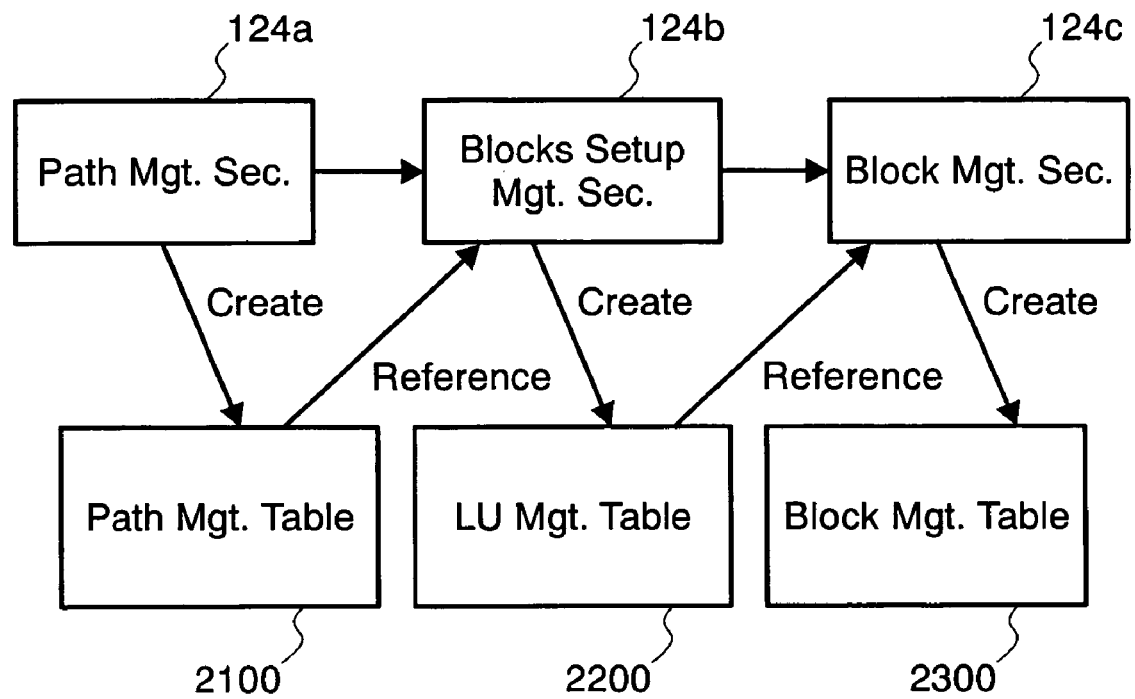
FIG. 3 is a functional block diagram to explain creating tables in an even blocking mode, the tables being used in the embodiment of the present invention.

FIG. 3 is a functional block diagram to explain creating the tables that are used in the embodiment of the present invention.

The path management section 124*a* creates the path management table 2100 at the start of the path management software. The path management table 2100 contains as many path entries as the number of paths that are recognizable at the start of the path management software.

The path management section 124*a* also updates the sequential I/O count 2104 or the random I/O count 2105, based on the result of judgment made by the section to judge request sequential 125 as to whether a normally processed I/O request is sequential access or random access.

Moreover, the path management section 124*a* updates the path status 2103 in the path management table 2100 when it receives a notification of path status change detected from the section to detect path fault 123*a* or the section to detect path recovery 123*b*. Upon the completion of updating the path management table 2100, the path management section 124*a* sends an LU data update request to update the LU management table 220 to the blocks setup management section 124*b*. At this time, the path management section 124*a* notifies the blocks setup management section 124*b* of the ID of the path that has become faulty or recovered.

In the variable blocking mode which will be described later, the path management section 124*a*, upon the completion of creating or updating the path management table 2100, sends a blocks setup request to create the blocks assignment table 2400 to the section to create/deliver blocks setup 127.

When receiving the request to create the LU management table 2200 from the path management section 124*a*, the blocks setup management section 124*b* creates the LU management table 2200, referring to the path management table 2100 created by the path management section 124*a*.

When receiving the request to update the LU management table 2200 from the path management section 124*a*, the blocks setup management section 124*b* updates the LU management table 2200, based on the ID information of the path that has become faulty or recovered, notified with the LU management table update request.

Specifically, in the case of a path fault notification from the section to detect path fault 123*a*, the blocks setup management section 124*b* refers to the LU management table 2200, extracts the path that was known to be faulty by the notification, identifies a logical unit to which the path connects, and decrements the number of paths 2203 for the logical unit by one in the LU management table 2200. Then, the blocks setup management section 124*b* deletes the ID of the faulty path notified with the LU management table update request from the path IDs 2204 field for the logical unit.

In the case of a path recovery notification from the section to detect path recovery 123*b*, the blocks setup management section 124*b* refers to the path management table 2100, identifies a logical unit to which the path that was known to have recovered by the notification connects, and increments the number of paths 2203 for the logical unit by one in the LU management table 2200. Then, the blocks setup management section 124*b* adds the ID of the recovered path notified with the LU management table update request to the path IDs 2204 field for the logical unit.

Upon the completion of creating the LU management table 2200, the blocks setup management section 124*b* requests the block management section 124*c* to create the block management table 2300. Upon the completion of updating the LU management table 2200, the blocks setup management section 124*b* requests the block management section 124*c* to update the block management table 2300.

When receiving the request to create or update the block management table 2300 from the blocks setup management section 124*b*, the block management section 124*c* creates or updates the block management table 2300, referring to the LU management table 2200 created by the blocks setup management section 124*b*. For example, at the start of the path management software, a request to create the block management table is issued and the block management table 2300 is created.

Moreover, the block management section 124c notifies the I/O request allocation section 123 of the IDs of the paths that are used to access the blocks.

FIG. 4 shows the path management table that is used in the embodiment of the present invention.

The path management table 2100 maintains updated information about the paths that are recognizable at the start of the path management software. That is, a new path management table 2100 is created at the start of the path management software and its information is updated when a path fault occurs or when the faulty path has recovered.

Figure 7:
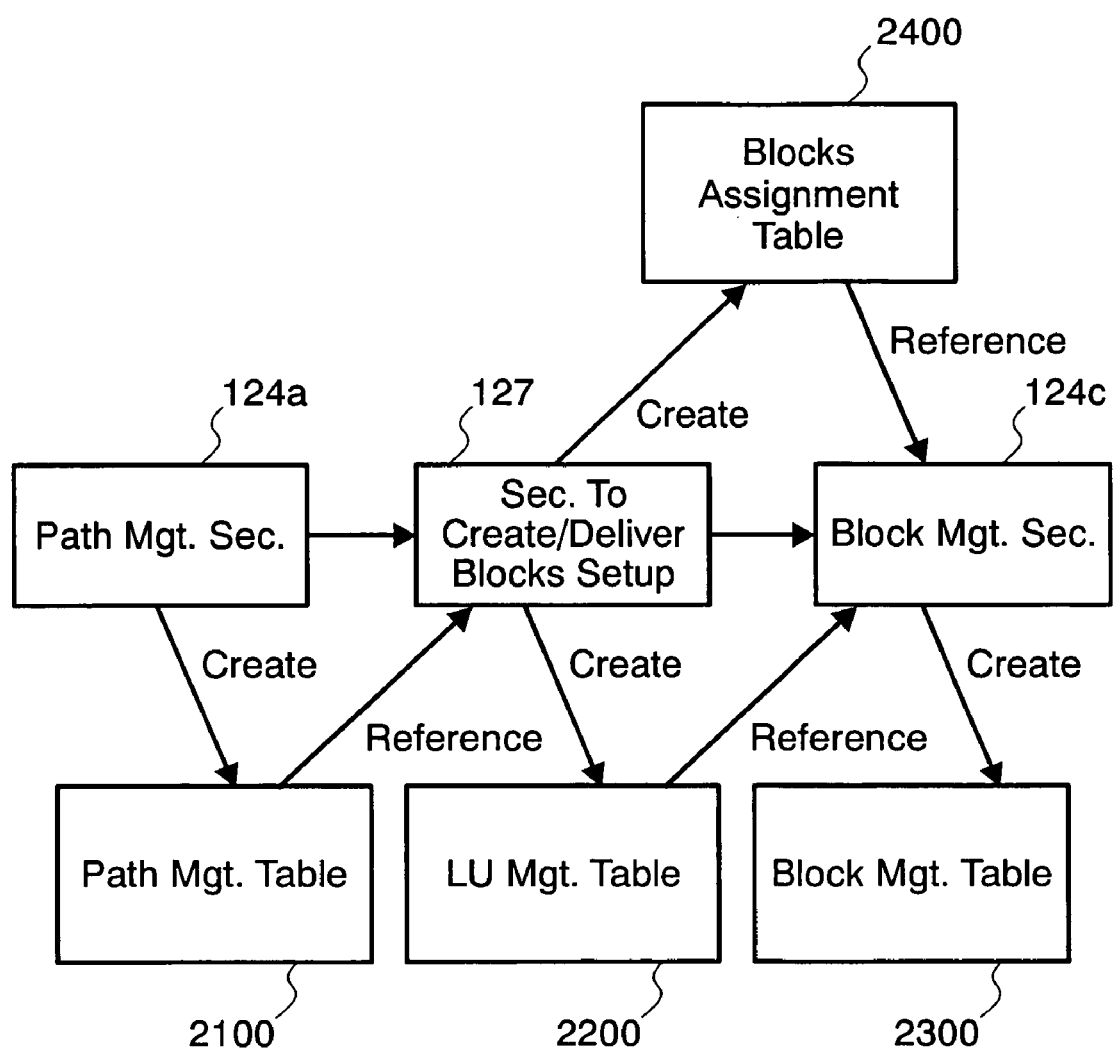
FIG. 7 is a functional block diagram to explain creating the tables in a variable blocking mode, the tables being used in the embodiment of the present invention.

The path management table 2100 is created in both even blocking mode and variable blocking mode. The even blocking mode is to divide a logical unit by the number of active paths into a plurality of blocks of even capacity (size) and assign one path to one block. On the other hand, the variable blocking mode is to divide a logical unit into a plurality of blocks, according to the blocks assignment table 2400 (FIG. 7).

The path management table 2100 is created by the path management section 124a and the blocks setup management section 124b references this table when creating (or updating) the LU management table 2200. The path management table 2100 is always maintained during the run of the path management software.

The path management table 2100 contains the following information items: path ID 2101, logical unit (LU) 2102, path status 2103, sequential I/O count 2104, and random I/O count 2105. These information items per path ID are stored.

The path ID 2101 is the identifier assigned to a path by the path management unit 120 and path IDs are associated with logical paths in one-to-one correspondence. The logical unit (LU) 2102 is the identifier assigned to a logical unit in the storage equipment and one or a plurality of paths are set up to terminate at one logical unit. One or a plurality of path IDs is associated with one logical unit.

The path status 2103 indicates whether or not the path identified by the path ID 2101 entry is capable of operating. That is, if the path is in the active state that it can transmit an I/O request normally, the path status field contains "online." Otherwise, if a fault occurs in the path and the path is placed in the blocked state that it cannot transmit an I/O request normally, the path status field contains "offline."

The sequential I/O count 2104 field contains a total count of sequential access I/O requests transmitted through the path as the result of the judgment as to whether an I/O request is sequential access or random access, made by the section to judge request sequential 125. The random I/O count 2105 field contains a total count of random access I/O requests transmitted through the path as the result of the above judgment. The sequential IO count 2104 and the random I/O count 2105 are initialized to "0."

Figure 5:
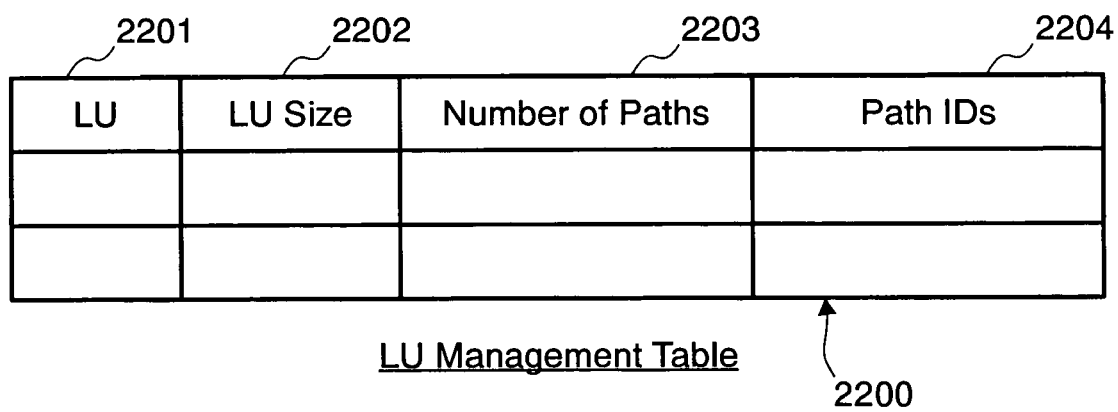
FIG. 5 shows an illustrative LU management table that is used in the embodiment of the present invention.

FIG. 5 shows the LU management table that is used in the embodiment of the present invention.

The LU management table 2200 maintains the configuration states of logical units. The blocks setup management section 124b creates (or updates) this table, referring to the path management table 2100. After the path management table 2100 is created (or updated), the LU management table 2200 is referenced when the block management section 124c creates (or updates) the block management table 2300. The LU management table 2200 is created in both even blocking mode and variable blocking mode.

The LU management table 2200 contains the following information items: logical unit (LU) 2201, storage capacity (LU size) 2202 of the logical unit, the number of paths 2203 that are placed in the active state, and path IDs 2204 of the active paths. These information items per logical unit are stored.

The logical unit (LU) 2201 field contains the identifier of each of the logical units 2102 entered in the path management table 2100, wherein duplicated information about a same LU is eliminated. The field of storage capacity (LU size) 2202 of the logical unit contains the storage capacity of the logical unit entered in the logical unit 2201 field.

The number of paths 2203 field contains the number of active paths connected to the logical unit entered in the logical unit 2201 field. The number of paths is obtained by summing up the number of paths whose status 2203 is active (online), associated with the logical unit, in the path management table 2100. The number of active paths entered in the number of paths 2203 field is decremented by a path fault occurrence and the number of paths is updated in the LU management table 2200.

The path IDs 2204 field lists the IDs of all active paths connected to the logical unit entered in the logical unit 2201 field. In the variable blocking mode, however, the path IDs 2204 need not be listed in the LU management table 2200.

FIG. 6 shows the block management table that is used in the embodiment of the present invention.

The block management table 2300 provides information for selecting a favorable path. The I/O request allocation section 123 references this table, when allocating I/O requests delivered from the application 110 to the paths assigned to the blocks, using logical unit and start address information extracted from the I/O requests. The block management section 124c creates the block management table 2300, referring to the LU management table 2200.

The block management table 2300 contains the following information items: block ID 2301, block size 2302, logical unit (LU) 2303, start address 2304, path ID 2305, sequential I/O count 2306, and random I/O count 2307. These information items per block ID are stored.

The block ID 2301 field contains the identifier assigned to a block by the path management unit 120 and block IDs are associated with blocks in one-to-one correspondence.

The block size 2302 field contains the length of the block entered in the block ID 2301 field. The block management section 124c calculates the block size, referring to the LU management table 2200.

The logical unit (LU) 2303 field contains the identifier assigned to a logical unit and this is the identifier of the logical unit 2102 associated with the path ID 2203 entered in the path management table 2100.

The start address 2304 field contains the start address of each block obtained by the block management section 124c.

The path ID 2305 field contains the ID of the path that is used to access the block. The path IDs are notified from the path management section 124a and the IDs of only the paths that can be used at the present are entered. If one path is assigned to one block, there is one path ID 2305 field for the block. If a plurality of paths is assigned to one block, there is a plurality of ID path 2305 fields for the block.

The sequential I/O count 2306 field contains a total count of sequential access I/O requests processed in the block (transmitted through the path) as the result of the judgment as to whether an I/O request is sequential access or random access, made by the section to judge request sequential 125. The random I/O count 2307 field contains a total count of random access I/O requests processed in the block (transmitted through the path) as the result of the above judgment. The sequential IO count 2306 and the random I/O count 2307 are initialized to "0".

In the above-mentioned even blocking mode, a logical unit is divided by the number of active paths into a plurality of blocks of even capacity (size). Therefore, when a path fault occurs or when the faulty path has recovered, the block management table is updated in the same procedure as performed at the start of the system. When a path fault occurs, the number of blocks decrements and the block size increases accordingly. When the faulty path has recovered, the number of blocks increments and the block size decreases accordingly (in other words, the blocks return to their setup before the path fault occurs).

FIG. 7 is a functional block diagram to explain creating the tables in another mode, the tables being used in the embodiment of the present invention.

FIG. 7 represents a process where the tables are created when the variable blocking mode is applied in which a logical unit is divided into a plurality of blocks, according to a rule defined in the blocks assignment table 2400, unlike the even blocking mode in which a logical unit is evenly divided into blocks, which is applied when the logical unit 220 is divided into blocks, as shown in FIG. 3. Therefore, the section to create/deliver blocks setup 127 retains the blocks assignment table 2400 containing information about the blocks into which a logical unit must be divided. In the even blocking mode, the section to create/deliver blocks setup 127 and the blocks assignment table 2400 are not used.

In the variable blocking mode, although the information processing system starts its operation in the even blocking mode at the start of the path management software, the operator specifies blocks setup, based on the sequential and random access I/O counts output by the section to display access information 128. When the section to create/deliver blocks setup 127 creates the blocks assignment table 2400, according to the specified blocks setup, the information processing system switches to operation in the variable blocking mode. When a path fault occurs or when the faulty path has recovered, the blocks assignment table 2400 is referenced, the size of each block which is determined, depending on the number of active paths at the present, and the number of paths assigned to each block are extracted, and the block management table 2300 is created.

It may also preferable that the section to create/deliver blocks setup 127 automatically creates the blocks assignment table 2400 by analyzing the sequential and random access I/O counts and optimizes the blocks assignment table 2400 without prompting the operator to specify blocks setup.

The path management section 124*a* creates (or updates) the path management table 2100 and requests the blocks setup management section 124*b* to create (or update) the LU management table 2200, as is the case for FIG. 3.

The blocks setup management section 124*b* creates or updates the LU management table 2200, referring to the path management table 2100, and requests the block management section 124*c* to create or update the block management table 2300, as is the case for FIG. 3.

When receiving the request to create or update the block management table from the blocks setup management section 124*b*, the block management section 124*c* creates or updates the block management table 2300, referring to the LU management table 2200 created by the blocks setup management section 124*b* and the blocks assignment table 2400 created by the section to create/deliver blocks setup 127.

Figure 8:
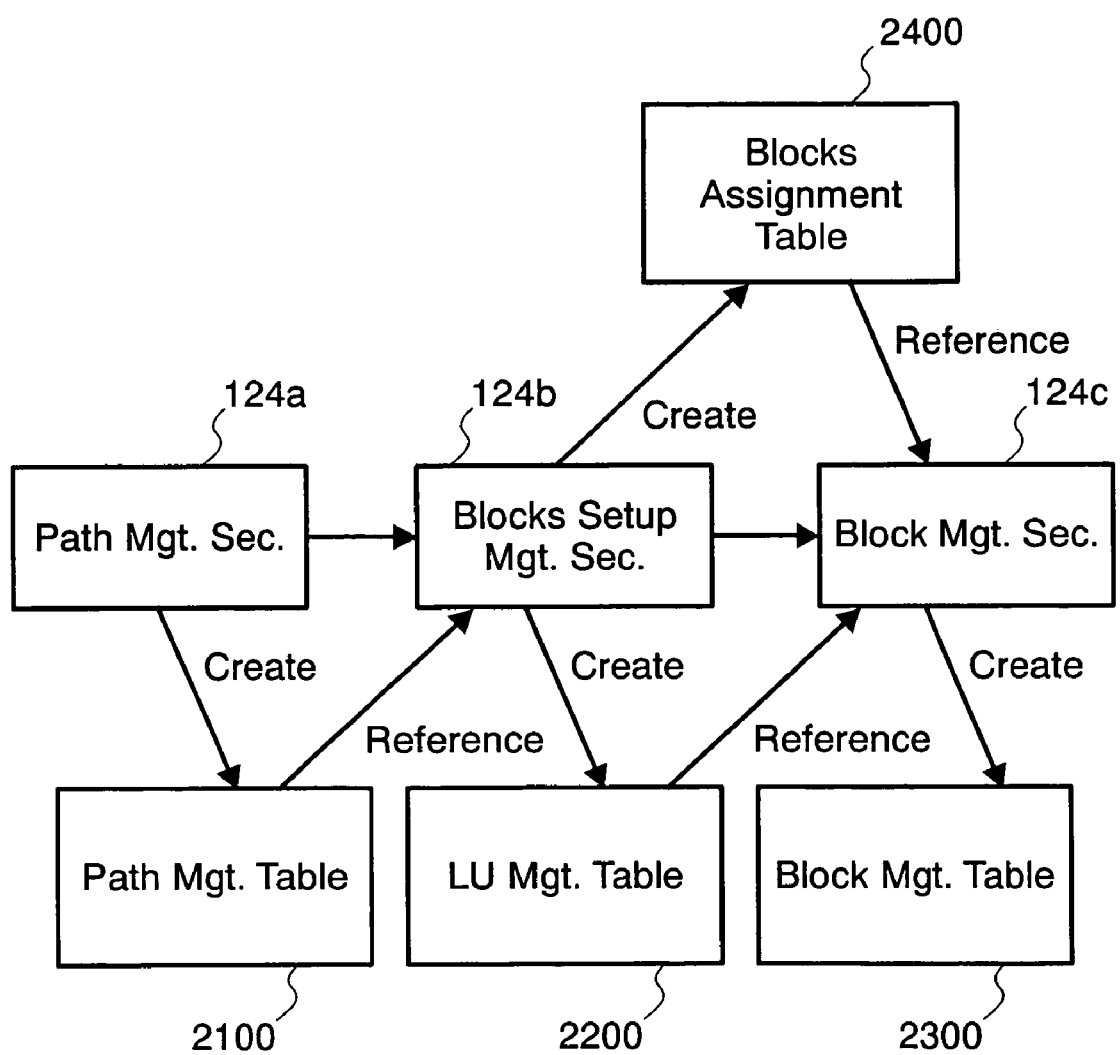
FIG. 8 is another functional block diagram to explain creating the tables in the variable blocking mode, the tables being used in the embodiment of the present invention.

FIG. 8 is another functional block diagram to explain creating the tables in the variable blocking mode, shown in FIG. 7, the tables being used in the embodiment of the present invention.

When receiving a request to create blocks setup data, the section to create/deliver blocks setup 127 creates the blocks assignment table 2400. When receiving a request to update blocks setup, the section to create/deliver blocks setup 127 updates the blocks assignment table 2400.

When receiving a request to create or update the block management table from the section to create/deliver blocks setup 127, the block management section 124*c* creates or updates the block management table 2300, referring to the LU management table 2200 created by the blocks setup management section 124*b* and the blocks assignment table 2400 created by the section to create/deliver blocks setup 127.

FIG. 9 shows the blocks assignment table that is used in the variable blocking mode (FIGS. 7 and 8) and in the embodiment of the present invention.

The section to create/deliver blocks setup 127 creates the blocks assignment table 2400 automatically (or based on user input), based on information presented by the section to display access information and taking account of the frequency and type of access to a logical unit (sequential access or random access). If the blocks assignment table 2400 exists, the block management section 124*c* creates the block management table 2300, referring to the blocks assignment table 2400. The blocks assignment table 2400 contains information as to how an available logical unit is divided into blocks and what active paths assignments to the blocks.

The blocks assignment table 2400 contains the following information items: logical unit (LU) 2401, the number of active paths 2402 that can be used for the logical unit, start address 2403, and the number of assigned paths 2404 set per block. These information items per logical unit are stored.

The logical unit (LU) 2401 field contains the identifier of a logical unit to which the variable blocking mode is applied among the logical unit 2102 entries in the path management table 2100.

The number of active paths 2402 field contains the number of active paths that can be used for each logical unit and this is used as a blocks setup data search key when a way of dividing the logical unit into blocks is determined.

The start address 2403 field contains the start address of each of the blocks into which the logical unit is divided, depending on the specified number of paths.

The number of assigned paths 2404 field contains the number of paths assigned to each of the blocks into when the logical unit is divided.

It may also be preferable to use an I/O monitor, collect I/O data by the I/O monitor, automatically select an optimum way of dividing a logical unit into blocks, and determine the number of paths. For example, for blocks to which random access occurs more frequently, it is also possible to apply a normal load balancing method which allocates I/O requests to the paths to spread loads evenly across the paths without applying the path assignments according to the present invention.

The blocks assignment table may be defined to divide a logical unit into blocks corresponding to partitions determined by the OS (operating system).

Figure 10:
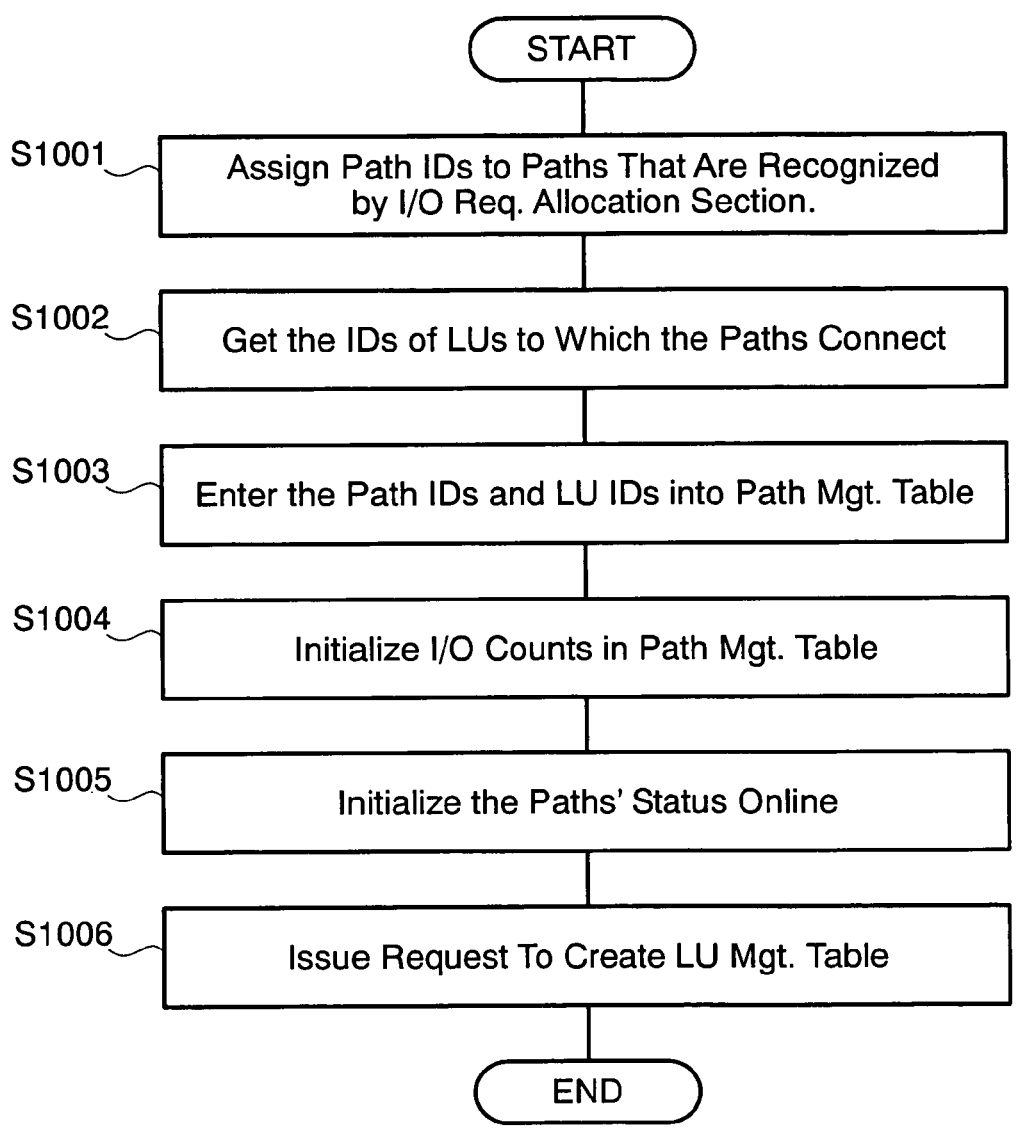
FIG. 10 is a flowchart of a procedure for creating the path management table, according to an embodiment of the present invention.

FIG. 10 is a flowchart of a procedure for creating the path management table, according to an embodiment of the present invention.

At the start of the path management software, this procedure is performed by the path management section 124*a*.

First, the path management section 124a gets the number of paths that are recognized by the I/O request allocation section 123 and assigns unique path IDs to the paths (S1001). For example, path IDs can be assigned to the paths from "0" by order of path information acquisition. Then, the path management section 124a gets the IDs of logical units to which the paths connect from the I/O request allocation section 123 (S1002). There is n-to-1 correspondence between path IDs and logical unit IDs.

The path management section 124a enters the thus obtained path IDs and logical unit IDs into the path ID 2102 fields and the logical unit (LU) 2102 fields, respectively, in the path management table 2100 (S1003). Then, the path management section 124a initializes the sequential I/O count 2104 and the random I/O count 2105 to "0" (S1004) and initializes the path status 2103 "online" for all the paths (S1005) in the path management table. Then, the path management section 124a issues a request to create the LU management table 2200 to the blocks setup management section 124b (S1006).

Accordingly, at the start of the path management software, the path management section 124a gets information for all paths that are recognized by the host side 100 and for the logical units that are accessed through the paths, creates the path management table 2100, and requests the blocks setup management section 124b to create the LU management table 2200.

Figure 11:
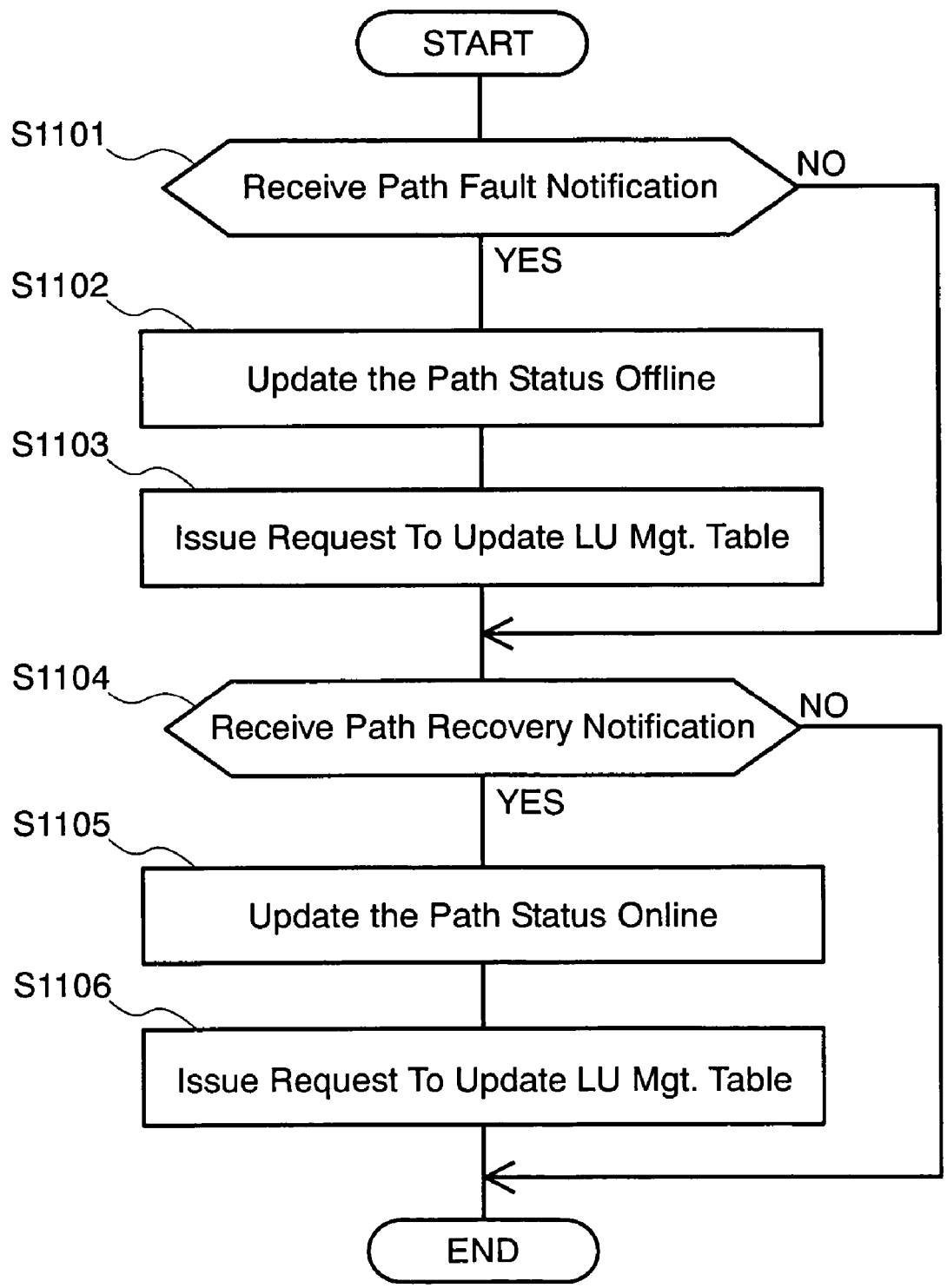
FIG. 11 is a flowchart of a procedure for updating the path management table, according to an embodiment of the present invention.

FIG. 11 is a flowchart of a procedure for updating the path management table, according to an embodiment of the present invention, and this procedure is performed by the path management section 124a.

The path management section 124a watches for notification from the section to detect a path fault 123a and the section to detect path recovery 123b. When receiving a path fault notification from the section to detect a path fault 123a (S1101), the path management section 124a updates the status 2103 of the path "offline" in the path management table 2100 (S1102). Then, the path management section 124a issues a request to update the LU management table 2200 to the blocks setup management section 124b (S1103). The path management section 124a sends the ID of the faulty path with the LU management table update request.

When receiving a path recovery notification from the section to detect path recovery 123b (S1104), the path management section 124a updates the status 2103 of the path "online" in the path management table 2100 (S1105). Then, the path management section 124a issues a request to update the LU management table 2200 to the blocks setup management section 124b (S1106). The path management section 124a sends the ID of the recovered path with the LU management table update request.

Figure 12:
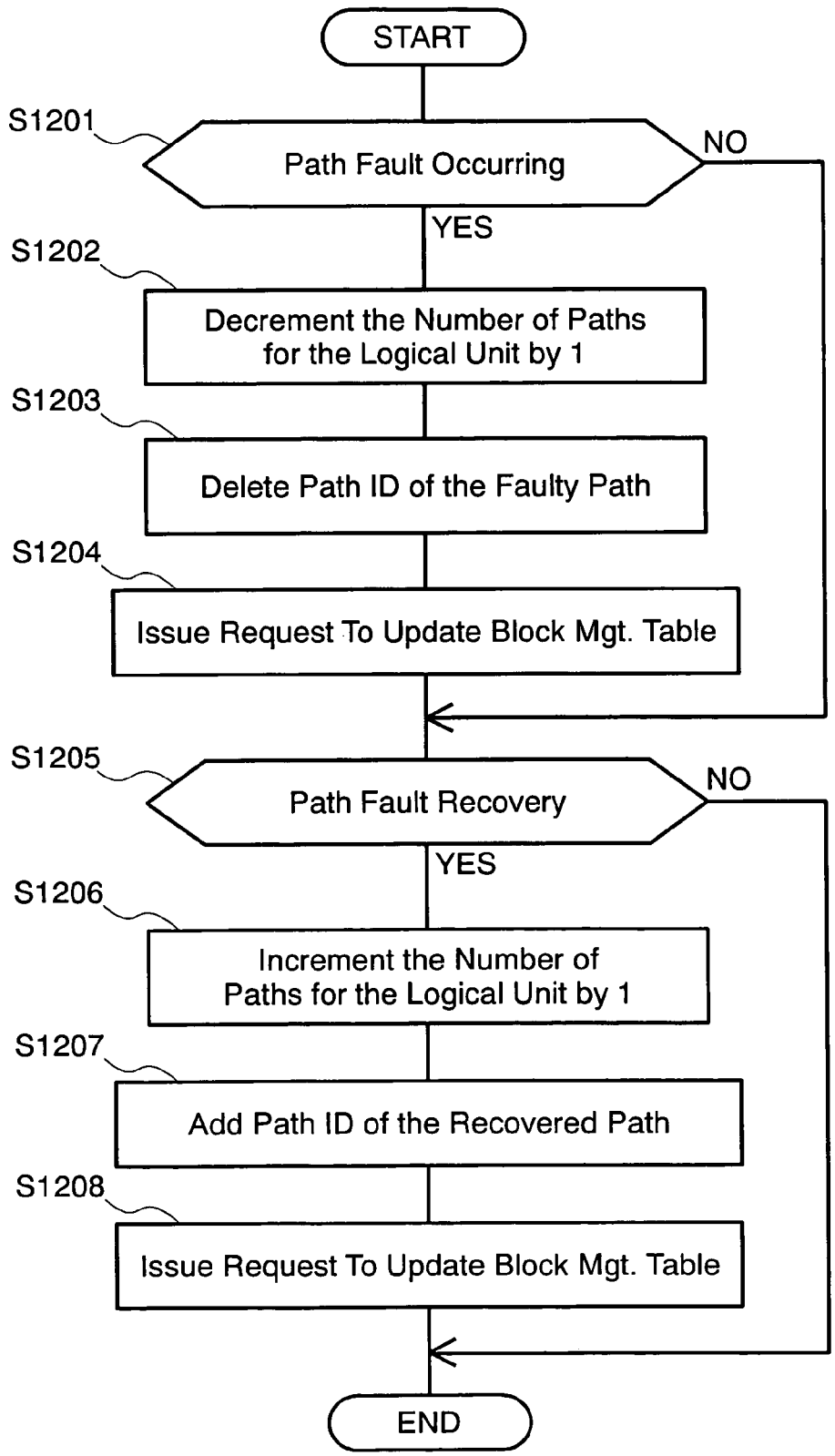
FIG. 12 is a flowchart of a procedure for updating the LU management table, according to an embodiment of the present invention.

FIG. 12 is a flowchart of a procedure for updating the LU management table, according to an embodiment of the present invention, and this procedure is performed by the blocks setup management section 124b.

When receiving the LU management table update request issued by the path management section 124a, the blocks setup management section 124b determines whether the update request is due to a path fault occurring (S1201). The path management section 124a may include path fault or recovery information in the LU management table update request so that the blocks setup management section 124b can make the above determination. Or, using the path ID notified with the LU management table update request, the blocks setup management section 124b may reference the path management table 2100, derive the status of the path from the table, and make the above determination.

As a result, if the update request is due to a path fault occurring, the blocks setup management section 124b decrements the number of paths by "1" in the LU management table 2200 (S1202). Then, the blocks setup management section 124b deletes the ID of the faulty path notified with the LU management table update request from the path IDs 2204 field (S1203). The blocks setup management section 124b issues a request to update the block management table 2300 to the block management section 124c (S1204).

When receiving the LU management table update request issued by the path management section 124a, the blocks setup management section 124b determines whether the update request is due to path recovery (S1205). As a result, if the update request is due to path recovery, the blocks setup management section 124b increments the number of paths by "1" in the L management table 2200 (S1206).

Then, the blocks setup management section 124b adds the ID of the recovered path notified with the LU management table update request to the path IDs 2204 field (S1207). At this time, referring to the path management table 2100, the blocks setup management section 124b gets information as to which logical unit that the ID of the recovered path is associated with.

Then, the blocks setup management section 124b issues a request to update the block management table 2300 to the block management section 124c (S1208).

Figure 13:
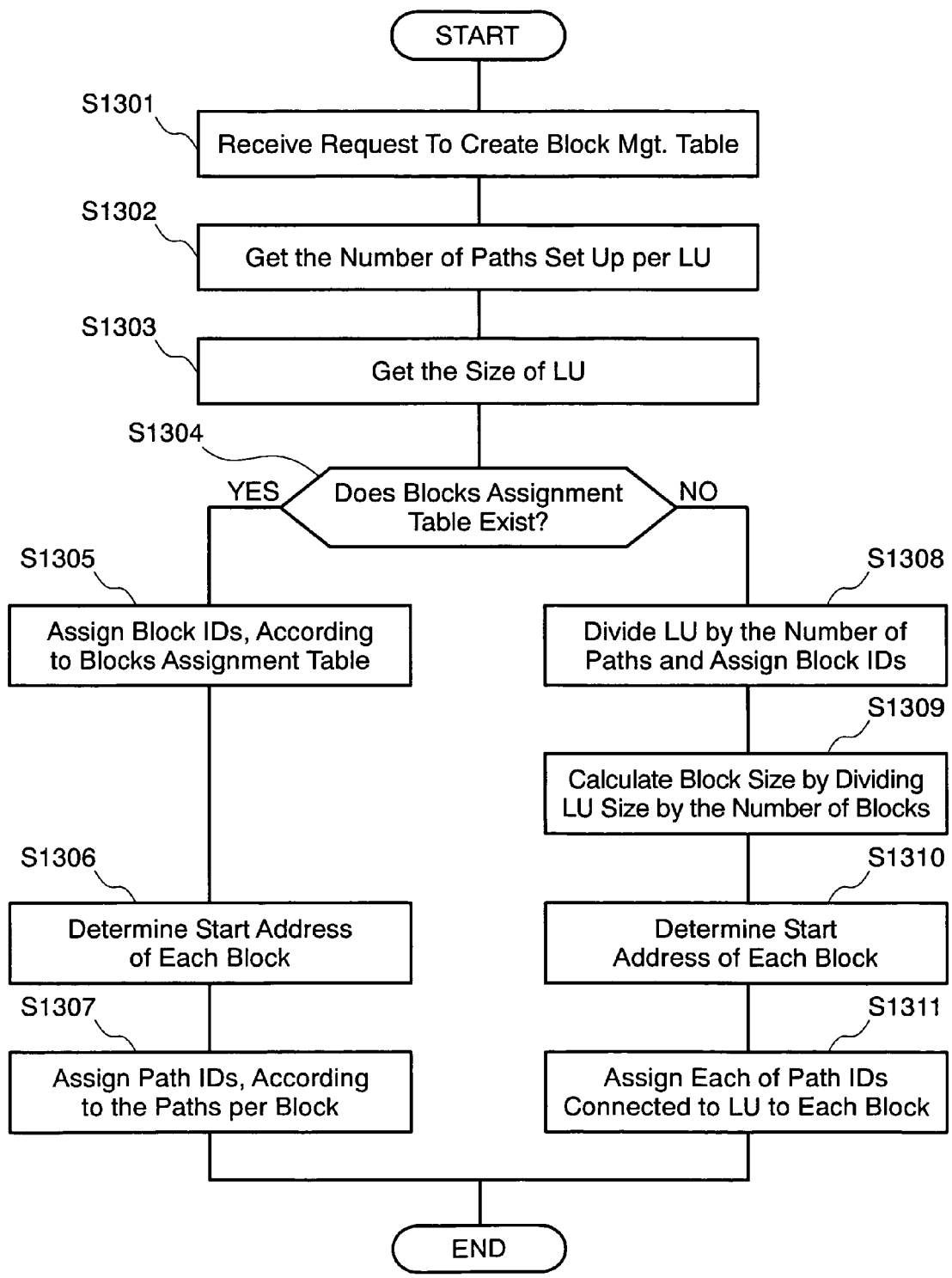
FIG. 13 is a flowchart of operation of a block management section, according to an embodiment of the present invention.

FIG. 13 is a flowchart of operation of the block management section 124c, according to an embodiment of the present invention.

The block management section 124c watches for a request to create the block management table from the blocks setup management section 124b. When receiving the request to create the block management table from the blocks setup management section (S1301), the block management section 124c references the LU management table 2200 and gets the number of active paths set for each logical unit and the capacity (size) of each logical unit (S1302, S1303). Then, the block management section 124c determines whether the blocks assignment table 2400 exists (S1304).

If the blocks assignment table 2400 exists, the block management section 124c judges the variable blocking mode on, determines the number of blocks into which a logical unit is divided, according to the contents of the blocks assignment table 2400, and assigns block IDs to the blocks (S1305). For example, blocks IDs can be assigned to the blocks from "0" in ascending order of start address specified in the blocks assignment table 2400.

Then, the block management section 124c determines the start address of each block, referring to the blocks assignment table 2400 (S1306). Therefore, the logical unit is divided into blocks such that each block has capacity determined by the range from the start address of the block to the start address of the next block. Then, the block management section 124c assigns the paths connected to each logical unit to the blocks and assigns the path IDs to the blocks (S1307).

Otherwise, if the blocks assignment table 2400 does not exist, the block management section 124c judges the even blocking mode on, divides each logical unit by the number of active paths into a plurality of blocks, and assigns block IDs to the blocks (S1308). The block management section 124c divides the logical unit capacity by the number of blocks (the number of paths), thus calculating the size of each block (S1309). Thus, the logical unit is divided into blocks of even capacity.

Then, the block management section 124c determines the start address of each block, based on the size of each block calculated in step S1309 (S1310). The block management section 124c assigns the paths connected to the logical unit to the blocks and assigns the path IDs to the blocks (S1311).

Accordingly, at the start of the path management software, when receiving the request to create the block management table from the blocks setup management section 124b, the block management section 124c creates the block management table 2300, referring to the LU management table 2200 (the blocks assignment table, as required). If the even blocking mode is one and the blocks assignment table 2400 is not created, the block management section 124c divides each logical unit by the number of active paths into even size blocks and creates the block management table 2300. In the even blocking mode, all information necessary to create (or update) the block management table is stored in the LU management table.

The above-described procedures shown in FIGS. 10, 12, and 13 are sequentially performed at the start of the path management software and the path management table 2100, LU management table 2200, and block management table 2300 are created.

Figure 14:
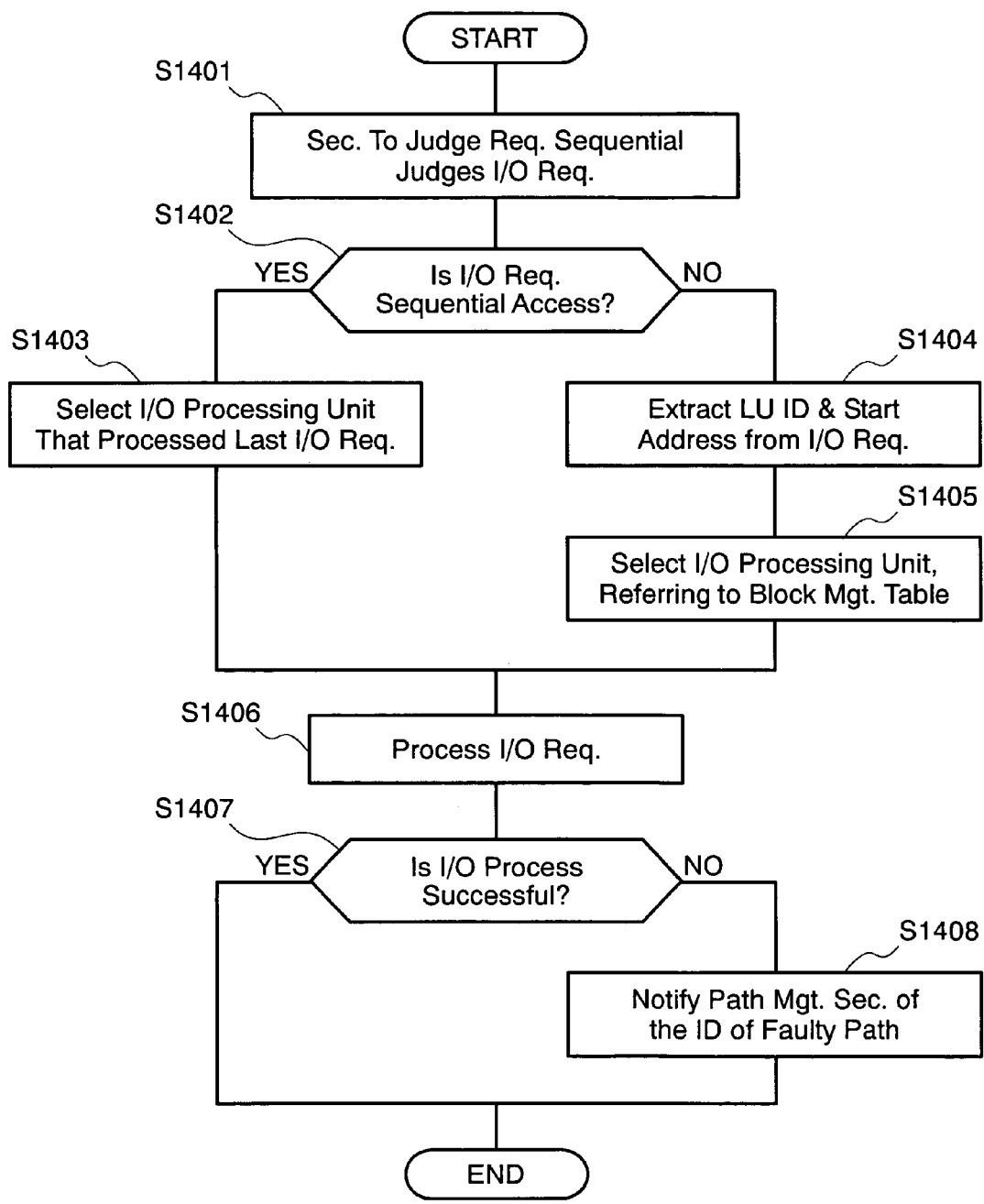
FIG. 14 is a flowchart of I/O processing, according to an embodiment of the present invention.

FIG. 14 is a flowchart of I/O processing, according to an embodiment of the present invention, and this processing is performed by the path management unit 120.

When the I/O request receiving section 121 receives an I/O request, the section to judge request sequential 125 judges whether the I/O request is sequential access I/O or random access I/O (S1401, S1402). To make this judgment, it is determined whether the I/O request is to get access to a location following a location specified in an I/O request of same type which was processed prior to the I/O request. The I/O request judged sequential or random is queued into the I/O request queue 126.

As the result of judgment made by the section to judge request sequential 125, when the I/O request is judged to be sequential access I/O, the I/O request allocation section 123 appoints one of the processing units 131 to 134 to handle the I/O request so that the I/O request is transmitted through the same path that was used to transmit the last I/O request of same type and updates I/O processing unit appointment information (S1403). This I/O processing unit appointment information is a table in which the address to be accessed in the logical unit and the ID of the path used for the I/O process are stored. If the start address of the I/O process requested by the I/O request succeeds (or falls within a given range from) the address specified in the table, the I/O request is judged sequential access and transmitted through the path whose ID is specified in this table (I/O processing unit appointment information). If the I/O process is completed normally, the size of the data that has been read or written by this I/O process is added to the address specified in the table. Because the path used to transfer the I/O request is the same as the path specified in the table, the path ID need not be updated. If the start address of the I/O process requested by the I/O request does not succeed (or falls outside the given range from) the address specified in the table, the I/O request is judged random access and a path is determined by reference to the block management table 2300.

As the result of judgment made by the section to judge request sequential 125, when the I/O request is judged to be random access I/O, the logical unit ID and the start address to be accessed are extracted from the I/O request (S1404). In some embodiment, it may also possible to skip the judgment as to whether the I/O request is random or sequential access I/O (that is, skip the steps S1401 to S1403) and execute the step S1404 for all I/O requests and extract the logical unit ID and the start address to be accessed from the I/O requests.

By reference to the block management table 2300, the logical unit to be accessed is determined from the logical unit information and the block to be accessed is determined from the start address. Then, the path assigned to the block is determined from the path ID field in the block management table 2300. Thus, the I/O request allocation section 123 appoints one of the processing units 131 to 134 to transmit the I/O request through the path assigned to the block and updates the I/O processing unit appointment information (S1405).

Then, the I/O request is delivered to the appointed I/O processing unit and the I/O request is processed by the appointed I/O processing unit, one of 131 to 134 (S1406). It is determined whether the I/O process is successful (S1407). If the I/O process is successful, this procedure terminates. If not, the section to detect path fault 123a detects the path in which a fault has occurred and notifies the path management section 124 of the path ID (S1408).

As described hereinbefore, in the embodiment of the preset invention, a logical unit is divided into blocks, a cache memory is provided to prefetch and store both data in a location to be accessed by a data input/output request and data in locations following the location within the physical devices, requests for sequential access to a same block are transmitted through a same logical path. Consequently, the prefetch caching function can be used effectively even when the load balancing function is performed.

Even during sequential access, even if a random access request occurs occasionally, the random access request is allocated to a different path if it is for access to a different block. Therefore, the previously stored cache contents can be used to process an I/O request for access to a location following the location that was accessed by the last sequential access request. Particularly, if a plurality of applications gets access to one logical unit concurrently and even if requests for sequential access to different blocks are issued alternately, the cache contents can be used effectively.

To take full advantage of the above-mentioned prefetch caching, the size of blocks into which a logical unit is divided and the number of paths assigned to the blocks can be altered and performance of access to the logical unit can be enhanced. That is, by altering block size, I/O requests can be allocated to the paths evenly and access performance can be enhanced. By assigning a plurality of paths to a block, a load balancing function within the block can be achieved effectively. This load balancing function within the block is effective if random access to one block occurs more frequently.

When a logical path fault is detected or when the faulty logical path has recovered, reconfiguring a plurality of blocks into which a logical unit is divided is performed (for example, block size of the blocks and/or the number of paths assigned to the blocks are altered). According to logical path status reconfiguring the blocks can be performed so that I/O processes are performed efficiently.

The invention claimed is:

1. An information processing system comprising
   a storage equipment which includes a logical unit logically assigned to physical devices and
   an information processing apparatus which sends data input/output requests to said storage equipment,
   wherein
   the data input/output requests are transferred through logical paths serving as communication paths to said logical unit, wherein
a cache memory is provided to prefer etch and store both data in a location to be accessed by one of said data input/output requests and data in locations following said location within said physical devices,
said information processing apparatus comprising
a path selection management section which manages configurations of a plurality of blocks into which said logical unit is divided,
an I/O request allocation section which allocates data input/output requests to be transmitted to said storage equipment to said logical paths, and
I/O processing units which transmit said data input/output requests through said logical paths, according to the allocation determined by said I/O request allocation section, pursuant to an established protocol,
wherein
said path selection management section assigns at least one of said logical paths to one of said blocks, and
said I/O request allocation section allocates data input/output requests that specify consecutive locations on the logical unit to the same logical path assigned by said path selection management section when data input/output requests that specify consecutive locations on the logical unit are received.

2. The information processing system according to claim 1, wherein said I/O request allocation section includes
a section to detect a path fault which detects a faulty path among said logical paths and
a section to detect path recovery which detects recovery of the faulty path among said logical paths, wherein
when a faulty path is detected by said section to detect a path fault or when the faulty path recovery is detected by said section to detect path recovery, said path selection management section reconfigures said blocks by altering at least one of size of said blocks or the number of paths assigned to said blocks.

3. The information processing system according to claim 1, wherein said cache memory is included in a disk control unit within said storage equipment.

4. The information processing system according to claim 1, wherein said I/O processing units are provided with said cache memory.

5. The information processing system according to claim 1, wherein said path selection management section includes
a path management section which creates a path management table containing information about said logical paths that are recognizable at the start of said information processing apparatus,
a blocks setup management section which creates an LU management table containing information about said logical units, referring to said path management table, and
a block management section which creates a block management table containing information about said blocks, referring to said LU management table, wherein
said path selection management section divides said logical unit into a plurality of blocks and assigns said logical paths to said blocks, referring to said block management table.

6. The information processing system according to claim 1, wherein said I/O request allocation section:
appoints one of said I/O processing units to transmit a data input/output request through the same logical path that was used to transmit the previous data input/output request when said data input/output request sent from said information processing apparatus is sequential to the previous data input/output request; and
appoints one of said I/O processing units to transmit said data input/output request through a path assigned to said block when said data input/output request sent from said information processing apparatus is a random access request.

7. An information processing apparatus which sends data input/output requests to a storage equipment which includes a logical unit logically assigned to physical devices through logical paths serving as communication paths to said logical unit, said information processing apparatus comprising
a path selection management section which manages configurations of a plurality of blocks into which said logical unit is divided,
an I/O request allocation section which allocates data input/output requests to be transmitted to said storage equipment to said logical paths,
wherein
I/O processing units which transmit said data input/output requests through said logical paths, according to the allocation determined by said I/O request allocation section, pursuant to an established protocol, wherein
said path selection management section assigns at least one of said logical paths to one of said blocks, and
said I/O request allocation section allocates data input/output requests that specify consecutive locations on the logical unit to the same logical path assigned by said path selection management section when data input/output requests that specify consecutive locations on the logical unit are received.

8. The information processing apparatus according to claim 7, wherein said storage equipment or said information processing apparatus is provided with a cache memory which prefer etches and stores both data in a location to be accessed by one of said data input/output requests and data in locations following said location within said physical devices.

9. The information processing apparatus according to claim 7, said I/O request allocation section includes
a section to detect a path fault which detects a faulty path among said logical paths and
a section to detect path recovery which detects recovery of the faulty path among said logical paths, wherein
when a faulty path is detected by said section to detect a path fault or when the faulty path recovery is detected by said section to detect path recovery, said path selection management section reconfigures said blocks by altering one of size of said blocks or the number of paths assigned to said blocks.

10. The information processing apparatus according to claim 7, wherein said I/O processing units are provided with said cache memory.

11. The information processing apparatus according to claim 7, wherein said path selection management section includes
a path management section which creates a path management table containing information about said logical paths that are recognizable at the start of said information processing apparatus,
a blocks setup management section which creates an LU management table containing information about said logical units, referring to said path management table, and
a block management section which creates a block management table containing information about said blocks, referring to said LU management table, wherein
said path selection management section divides said logical unit into a plurality of blocks and assigns said logical paths to said blocks, referring to said block management table.

12. The information processing apparatus according to claim 7, wherein said I/O request allocation section:
appoints one of said I/O processing units to transmit a data input/output request through the same logical path that was used to transmit the previous data input/output request when said data input/output request sent from said information processing apparatus is sequential to the previous data input/output request; and
appoints one of said I/O processing units to transmit said data input/output request through a path assigned to said block when said data input/output request sent from said information processing apparatus is a random access request.

13. A computer program stored on a computer readable medium, which when executed, implements functions of an information processing apparatus which sends data input/output requests to a storage equipment which includes a logical unit logically assigned to physical devices through logical paths serving as communication paths to said logical unit, said computer program comprising
computer program code means for managing configurations of a plurality of blocks into which said logical unit is divided,
computer program code means for allocating the data input/output requests to be transmitted to said storage equipment to said logical paths,
computer program code means for transmitting said data input/output requests through said logical paths, according to the allocation determined by said allocation means, pursuant to an established protocol,
computer program code means for assigning at least one of said logical paths to one of said blocks, and
computer program code means for allocating data input/output requests that specify consecutive locations on the logical unit to the same logical path assigned to said one of said blocks when data input/output requests that specify consecutive locations on the logical unit are received.

* * * * *